US011892151B2

(12) United States Patent
Wu et al.

(10) Patent No.: US 11,892,151 B2
(45) Date of Patent: Feb. 6, 2024

(54) LIGHTING DEVICES WITH A ROTATABLE SUPPORT

(71) Applicant: Binovo Manufacturing Co., Ltd, Guangdong (CN)

(72) Inventors: Jing-xiang Wu, Guangdong (CN); Liang-bin Ling, Guangdong (CN); Rong-fu Li, Guangdong (CN)

(73) Assignee: Binovo Manufacturing Co., Ltd

( * ) Notice: Subject to any disclaimer, the term of this patent is extended or adjusted under 35 U.S.C. 154(b) by 0 days.

(21) Appl. No.: 17/374,292

(22) Filed: Jul. 13, 2021

(65) Prior Publication Data

US 2022/0057074 A1 Feb. 24, 2022

(30) Foreign Application Priority Data

Jul. 14, 2020 (CN) ......................... 202021384860.7

(51) Int. Cl.
*F21V 21/30* (2006.01)
*F21V 21/096* (2006.01)
*F21V 21/14* (2006.01)

(52) U.S. Cl.
CPC .......... *F21V 21/30* (2013.01); *F21V 21/0965* (2013.01); *F21V 21/145* (2013.01)

(58) Field of Classification Search
CPC .. F21V 21/0885; F21V 21/0965; F21V 21/30; F21V 23/0421; F21L 15/14; F21L 15/08; F21L 15/10
See application file for complete search history.

(56) References Cited

U.S. PATENT DOCUMENTS

| | | | | | |
|---|---|---|---|---|---|
| 1,222,458 | A * | 4/1917 | Peterson | F21V 21/0885 | 224/462 |
| 1,527,479 | A * | 2/1925 | Hauenstein | F21V 21/14 | 248/127 |
| 1,807,501 | A * | 5/1931 | Alexander | F21L 15/08 | 248/229.14 |
| 2,247,131 | A * | 6/1941 | Muldoon | F21V 21/145 | 248/688 |
| 3,069,539 | A * | 12/1962 | Kidd | F21L 15/14 | 362/106 |
| 3,249,271 | A * | 5/1966 | Allbritton | F21L 15/08 | 224/181 |
| 4,092,580 | A * | 5/1978 | Prinsze | F21L 4/085 | 320/115 |

(Continued)

*Primary Examiner* — Peggy A Neils
*Assistant Examiner* — James M Endo
(74) *Attorney, Agent, or Firm* — Haynes and Boone, LLP

(57) ABSTRACT

An apparatus for a lighting device with a rotatable support includes a lamp body, the lamp body is provided with the support capable of rotating relative to the lamp body, the support is provided with a magnetic block, and a lighting port of the lamp body is arranged on the side wall of the lamp body toward the direction of the rotation center line of the support. When the adjustable lighting device is used, the support is fixed on a metal object in a place to be illuminated through the magnetic block and the side face direction of the lighting port of the lamp body can be adjusted by adjusting the lamp body to rotate relative to the support, and therefore the side face lighting angle of the lighting port is adjusted, and due to the fact that the lamp body can rotate relative to the support at any angle, stepless adjustment of the side lighting angle of the lighting port can be achieved.

15 Claims, 4 Drawing Sheets

(56) References Cited

U.S. PATENT DOCUMENTS 4,506,317 A * 3/1985 Duddy ................ F21V 21/0965 362/396
4,750,095 A * 6/1988 Huang ................ F21V 23/0414 362/190
5,181,774 A * 1/1993 Lane ...................... F16M 13/02 362/549
5,339,229 A * 8/1994 Snyder .................... F21V 21/08 362/190
5,491,621 A * 2/1996 Duty ..................... F21V 19/009 362/396
5,575,555 A * 11/1996 Chang ..................... F21L 15/08 362/109
5,577,697 A * 11/1996 Accordino .......... F21V 21/0965 248/206.5
5,772,309 A * 6/1998 Groben ..................... F21L 4/08 362/183
5,836,679 A * 11/1998 Klamm ................... F21L 15/14 362/391
6,099,142 A * 8/2000 Liu ........................ B60Q 1/302 362/184
6,135,620 A * 10/2000 Marsh ....................... F21V 3/02 362/377
6,179,431 B1 * 1/2001 Chien ....................... F21L 4/02 362/802
6,267,487 B1 * 7/2001 Tucker ................ F21V 21/0965 362/382
6,902,200 B1 * 6/2005 Beadle .................... F16C 11/04 285/185
7,682,036 B2 * 3/2010 Reiff ....................... F21V 25/12 362/228
8,807,814 B1 * 8/2014 Glenn ................. F21V 33/0096 362/580
8,931,917 B1 * 1/2015 Liu ......................... F21L 14/00 362/218
10,670,253 B1 * 6/2020 Lemon ................... H05B 47/10
2010/0165612 A1 * 7/2010 Yeh ..................... F21V 21/0885 362/190
2011/0085324 A1 * 4/2011 Liu ......................... F21V 29/70 362/190
2012/0212968 A1 * 8/2012 Brown ................ F21V 21/0965 362/396
2013/0271967 A1 * 10/2013 Liu ..................... H01M 50/531 362/186
2013/0335955 A1 * 12/2013 Lee .................... G02B 19/0014 362/190
2013/0343042 A1 * 12/2013 Windom ............. H01M 10/488 362/183
2014/0078759 A1 * 3/2014 Sparks ...................... F21L 4/00 362/382
2015/0155728 A1 * 6/2015 Feustel ................. F21V 14/065 362/183
2015/0267902 A1 * 9/2015 Zhang ....................... F21L 4/04 362/188
2018/0111547 A1 * 4/2018 Gall ......................... B60Q 3/35
2018/0231214 A1 * 8/2018 Bian ....................... F21L 4/085
2019/0331326 A1 * 10/2019 Proeber ............... F21V 23/0414

* cited by examiner

LIGHTING DEVICES WITH A ROTATABLE SUPPORT

CROSS REFERENCE TO RELATED APPLICATIONS

This application is a continuation of Chinese Patent No. CN212430501U granted Jan. 29, 2021 which was filed as application serial number CN202021384860.7 filed on Jul. 14, 2020. This patent is hereby incorporated by reference.

FIELD

Embodiments of lighting devices with a rotatable support relate to the field of lighting, in particular to a lighting device with a rotatable support.

BACKGROUND

The side lighting angles of the multifunctional emergency flashlights currently on the market are not adjustable. A single lighting angle, after the flashlight is fixed, provides limited lighting for the demand points, and it is necessary to carry multiple emergency lights. Only with some emergency work capabilities, it brings inconvenience to users.

BRIEF SUMMARY

In view of the above shortcomings of the prior art, one purpose of embodiments of a lighting device is to provide a lighting device with a rotatable support, which can adjust the side lighting angle of the lighting device.

In order to achieve the above purpose, a technical solution used in some embodiments is: a lighting device with a rotatable support, including a lamp body, the lamp body with a support that can rotate relative to the lamp body, and the lighting port of the lamp body located with side wall of the lamp body corresponding to the side of the rotation center line of the support.

In the above solution, when in use, the support is fixed on the object in the area to be illuminated. By adjusting the rotation of the lamp body relative to the support, the side position of the lighting port of the lamp body can be adjusted, so as to adjust the side lighting angle of the lighting port. The main body rotates at any angle relative to the support, and the side illumination angle of the illumination port can be steplessly adjusted.

Further, the side wall of the lamp body is provided with a circular groove, and the support includes a handle and a gripper connected with the handle. The position of the gripping glove on the circular groove is that the gripper can rotate relative to the circular groove. The ring groove cooperates to realize the rotation of the lamp body relative to the support, and the structure is simple.

Furthermore, the above-mentioned gripper has two grips, the two grippers are respectively located at both ends of the handle, and the side wall of the lamp body is provided with two circular grooves, and the grippers at both ends of the handle are respectively sleeved on the two circles of the lamp body. The location of the ring groove. In this way, both ends of the handle are respectively connected to the lamp body through the gripper, which can improve the stability of the connection between the handle and the lamp body, and the rotation of the lamp body relative to the handle is more stable.

Furthermore, an anti-skid ring is also provided between the above-mentioned annular groove wall and the gripper.

The anti-skid ring acts as a damping member to provide a relatively large friction force, so that when the lamp body rotates and adjusts the angle, it can stay at any angle position.

Further, the above-mentioned gripper has a closed ring structure, so that the gripper and the lamp body are assembled firmly and not easily separated; or, the above-mentioned gripper is a non-closed ring structure with an opening, so that the gripper and the lamp body are easy to assemble.

Further, the above-mentioned handle is provided with a magnetic block, so that the handle can be directly attached on the metal object, and the lamp can be quickly fixed.

Further, the end of the lamp body is also provided with a focus-adjustable strong light lamp cap, which can realize the functions of condensing and flooding; the lamp body is also provided with a buzzer alarm to realize the warning and alarm function.

Further, the above-mentioned lamp body is also provided with a charging socket, a discharging socket, and a switch button used to control the start and stop of the lamp body and mode switching, so that the lamp can be charged and stored, charged for third-party electronic equipment, and controlled to start and stop the lamp. And the mode switching function; in order to realize the waterproof function, the above-mentioned lamp body is provided with a waterproof cap corresponding to the area where the charging socket, the discharging socket, and the switch button are located.

Further, the above-mentioned waterproof cap is made of a soft material, so that without opening the waterproof cap, the switch button can be pressed by pressing the waterproof cap to realize the control of the lamp body.

Embodiments of a lighting device realizes the quick fixation of the lamp on the metal object in the area to be illuminated by adjusting the lamp body to rotate relative to the support by arranging a support that can rotate relative to the lamp body on the side wall of the lamp body and a magnetic block on the support handle. Embodiments achieve the adjustment of the side orientation of the lighting port of the lamp body, so as to realize the stepless adjustment of the side lighting angle of the lighting port and better meet the lighting requirements of the lighting demand points. In addition, the lamp also has the functions of spotlight and floodlight, warning alarm and power bank, providing more convenience for users.

In one embodiment, a lighting device with a rotatable support includes a lamp body, characterized in that a support provided on the lamp body can rotate relative to the lamp body. The lighting device further includes a lighting port of the lamp body is arranged on the side wall of the lamp body toward the direction of the rotation center line of the support. Alternatively, the side wall of the lamp body is provided with a circular groove, and the support includes a handle and a gripper connected with the handle, the gripper is sleeved at the position of the circular groove, and the gripper can rotate relative to the circular groove. In one alternative, there are two grippers, and the two grippers are respectively located at both ends of the handle, and the side wall of the lamp body is provided with two circular grooves, and the grippers at both ends of the handle are respectively sleeved in the positions of the two circular grooves of the lamp body. In another alternative, an anti-skid ring is also provided between the groove wall of the circular groove and the gripper. Alternatively, the gripper is closed ring structure. In another alternative, the gripper is a non-closed ring structure with an opening. In another alternative, a magnetic block is provided on the handle. Alternatively, the end of the lamp body is also provided with a focus-adjustable strong light lamp head. In another alternative, the lamp body is further provided with a buzzer. Alternatively, the lamp body is also provided with a charging socket, a discharging socket and a control lamp body, a switch button for start-stop and mode switching, and the lamp body is provided with a waterproof cap at the location corresponding to the area where the charging socket, the discharging socket and the switch button are located. In another alternative, the waterproof cap is made of soft material.

In another embodiment, a lighting device includes a device body and an area light on a side of the device body. The lighting device further includes a handle, the handle rotatably attached to the device body, such that the handle is positionable in a variety of positions relative to the area light around the device body. Alternatively, the handle includes a magnetic portion such that the handle is magnetically attachable to a magnetizable material to support the device body. In one alternative, the handle is removable attachable to the device body via a first and second grip. In another alternative, the handle includes a hinge, such that the first grip is removable from the device body and rotatable away from the device body while the second grip is attached to the device body. Alternatively, the lighting device further includes a directional light on the device body. Alternatively, the device body is a cylinder, the area light is on a side of the cylinder, and the directional light is on an end of the cylinder and the handle rotates around the side of the cylinder.

DETAILED DESCRIPTION

Figure 1:
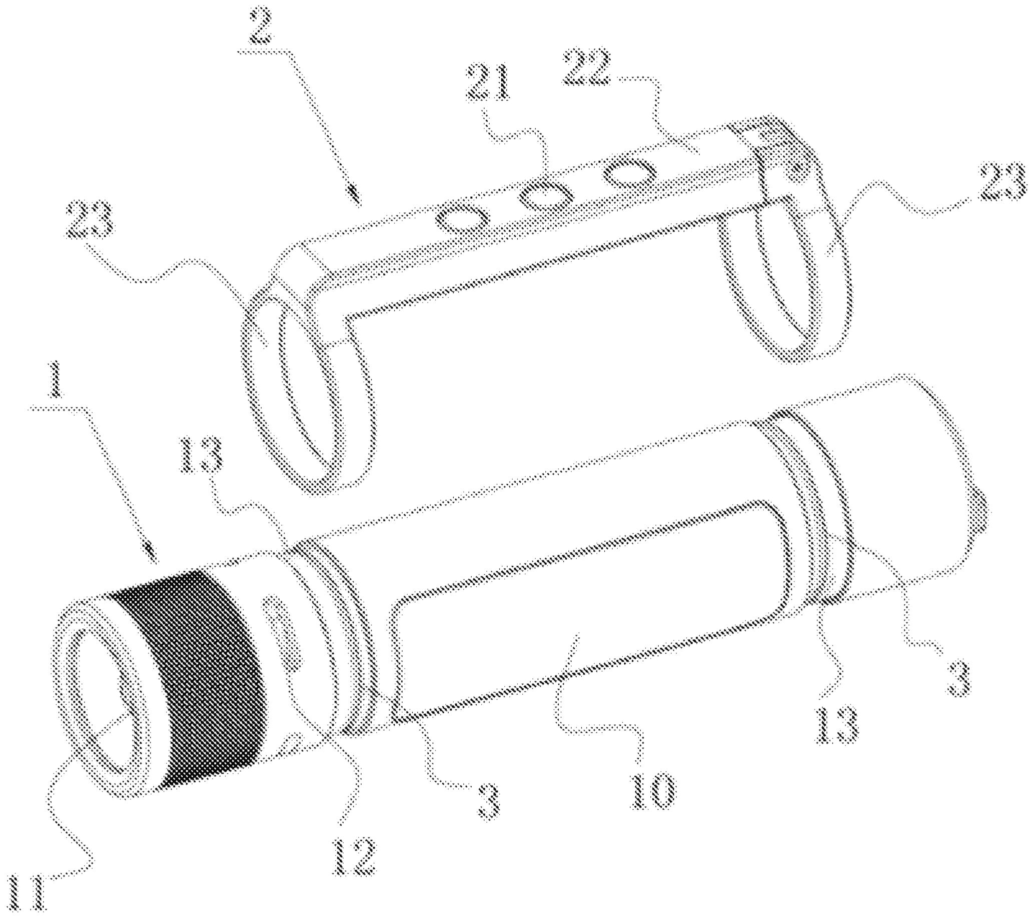
FIG. 1 shows an exploded schematic diagram of the structure of an embodiment of a lighting device.

Certain terminology is used herein for convenience only and is not to be taken as a limitation on the embodiments of a lighting device with a rotatable support. In many embodiments, the lighting device includes a magnetic attachment handle that is rotatable about the body of the device, such that a side area light may be positioned at a variety of angles. Additionally, the light device includes a directed light as well. Additionally, in some alternatives, one end of the handle may be detached from the lighting device at a hinge point allowing the handle to provide for additional attachment angles. The drawings are only used for exemplary description and cannot be understood as a limitation of the patent.

In order to describe embodiments more concisely, some parts in the drawings or descriptions that are well known to those skilled in the art but are not related to the main content of the invention are omitted. In addition, for ease of presentation, some parts in the drawings may be omitted, enlarged or reduced, but they do not represent the size or the entire structure of the actual product.

Figure 2:
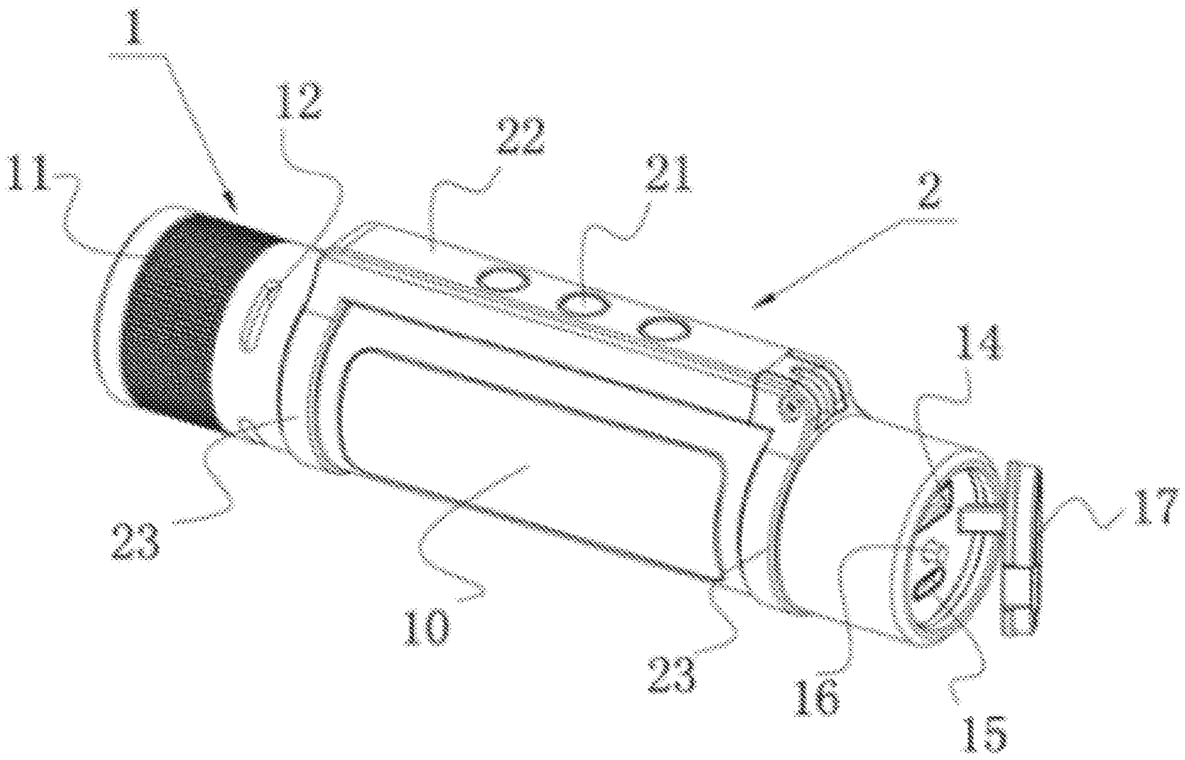
FIG. 2 shows a schematic diagram of the lighting device of FIG. 1.
Figure 3:
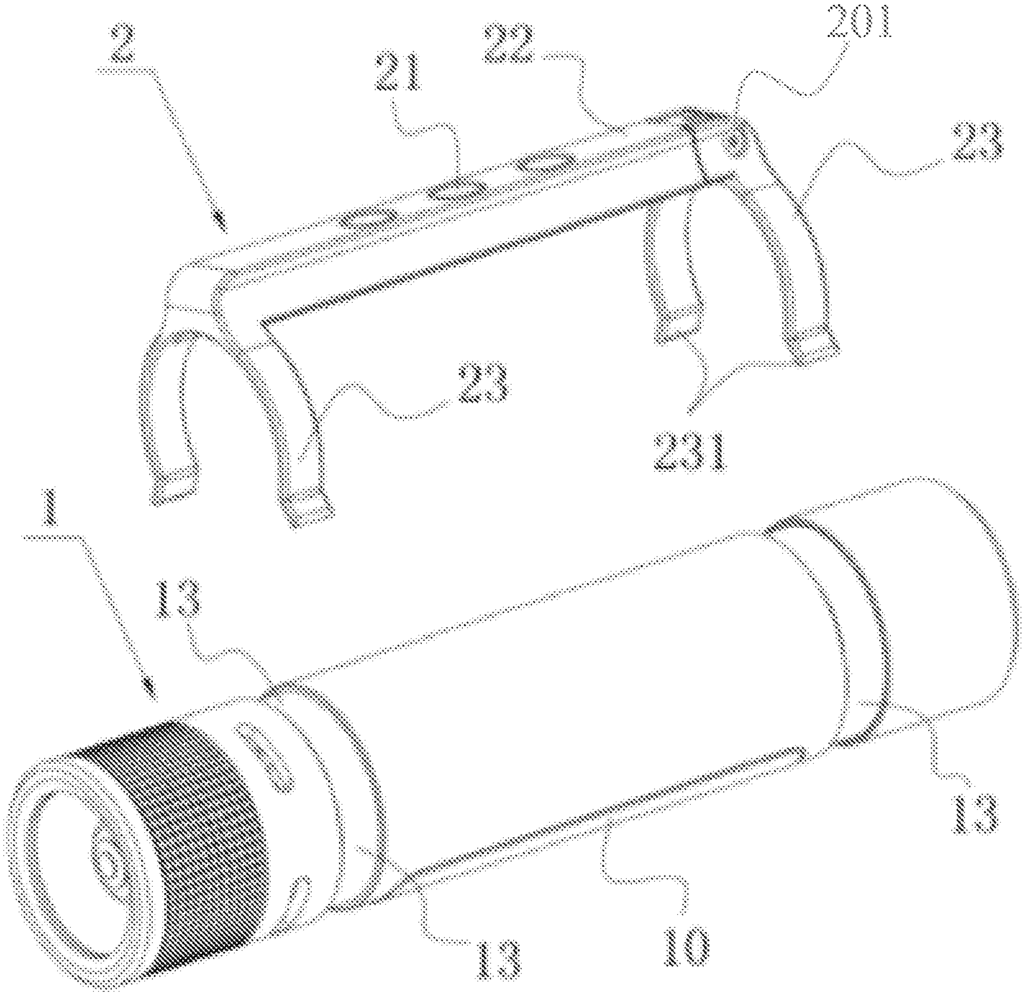
FIG. 3 an exploded schematic diagram of the structure of another embodiment of a lighting device.
Figure 4:
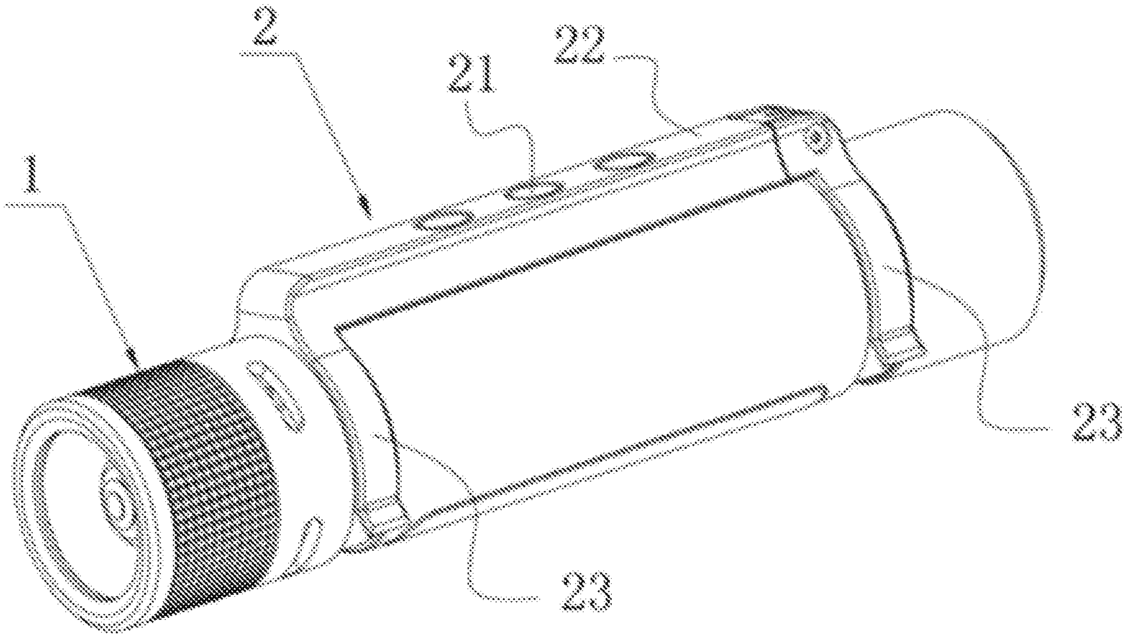
FIG. 4 shows a schematic diagram of the lighting device of FIG. 3.

One embodiment of a lighting device is shown in FIGS. 1 and 2. As shown, a lighting device with a rotatable support includes a lamp body 1 and a support 2. The lamp body 1 is a flashlight with a cylindrical structure. The lighting port 10 (side area light) of the lamp body 1 is located at the middle side wall of the lamp body 1, and the lamp. The side wall of the body 1 is provided with two circular grooves 13, and the lighting port 10 is located between the two circular grooves 13. The support 2 includes a handle 22 and two grippers 23, the two grippers 23 are closed circles. Ring structure, two grips 23 are respectively provided at both ends of the handle 22, and the distance between the two grips 23 corresponds to the distance between the two circular grooves 13 on the side wall of the lamp body 1, and the two ends of the handle 22. The grippers 23 are respectively sleeved in the two circular grooves 13 of the lamp body 1, so that the lamp body 1 can rotate 360 degrees relative to the support 2 with the center line of the gripper 23 as the center, and the two grippers 23 and the lamp body 1. The assembly is stable, and the two are not easy to separate.

When the above-mentioned lighting device is used, the handle 22 may be fixed on the object in the area to be illuminated. Then, the support 2 is fixed on the object. By adjusting the rotation of the gripper 23 of the lamp body 1 relative to the support 2, the lighting of the lamp body 1 can be adjusted. The side orientation of the opening 10 can be adjusted to adjust the side illumination angle of the illumination opening 10. Since the lamp body 1 can be rotated 360 degrees relative to the support 2, the side illumination angle of the illumination opening 10 can be steplessly adjusted.

In order to quickly fix the lamp, the above-mentioned handle 22 is provided with a magnetic block 21 on the side facing away from the lamp body 1, so that the handle 22 can be adsorbed to the metal object in the area to be illuminated by the magnetic block 21, and no other fixing tools are required. This provides for ease of use. In addition, in order to prevent the lamp body 1 from automatically rotating relative to the gripper 23, a non-slip ring 3 is provided between the groove wall of the annular groove 13 and the grip 23. The non-slip ring 3 is made of plastic material, such as silicone. The component provides greater friction, so that when the lamp body 1 is rotated to adjust the angle, it can stay at any angle position, and the position stability of the lamp body 1 during illumination is ensured.

As an improvement of this embodiment, the front end of the lamp body 1 described above is provided with a focus-adjustable strong light base 11, and the functions of focusing and flooding can be realized by adjusting the lamp cover of the strong light base 11. A buzzer 12 is also arranged between the front end of the lamp body 1 and the lamp body 1 to realize the warning and alarm function in emergency situations. In addition, the lamp body 1 of this embodiment is a rechargeable lamp. At the rear of the lamp body 1, there are provided a charging socket 15 for charging the power source of the lamp body 1, a discharge socket 14 for charging third-party electronic equipment, and a control. The switch button 16 for starting, stopping and mode switching of the lamp body 1, and the rear end of the lamp body 1 is also hinged with a waterproof cap 17, which is made of soft material. Covering the waterproof cap 17 can connect the charging socket 15, the discharge socket 14 and the switch button 16 are sealed in the cover to achieve the waterproof effect. The user may control the start, stop and mode switching of the lamp body 1, by directly pressing the waterproof cap 16 to press the switch button 16, without opening the waterproof cap 17. This makes the device easy to use, and also improve the waterproof level.

The lighting device in this implementation can also achieve stepless adjustment of the side lighting angle of the lighting port under the condition of a fixed position, providing users with a better lighting experience. At the same time, the lighting device also has spotlight and floodlight illumination, warning alarm and power bank functions to meet the various needs of users, thereby providing users with more convenience.

In another embodiment, the structure of the lighting device is similar to that of the first embodiment with the different primarily being that the structure of the grip 23 is different.

The gripper 23 of this embodiment is a non-closed ring structure with an opening, that is, a non-closed ring structure formed by cutting a circular arc part with an arc less than 7C from the closed ring structure to form an opening, so that the gripper 23 is similar Arc structure with radian greater than π. The gripper 23 is inserted into the annular groove 13 of the side wall of the lamp body 1 through its opening, and the gripper 23 itself is elastically clamped at the position of the annular groove 13 of the lamp body 1, so that the lamp body 1 is not easily removed from the gripper 23 The opening position is separated, which is convenient for assembly.

In addition, the two ends of the grip 23 of this embodiment are also provided with guide plates 231. The two guide plates 231 form a figure-eight structure, which makes it more convenient for the lamp body 1 to fit into the grip 23 from the opening position of the grip 23, so that the grip 23 and the lamp body 1 are more convenient to assemble. Additionally, in some alternative configurations, hinge 201 may rotate, allowing for one grip 23 to remain attached to lamp body 1, while the other is rotated away, allowing for different attachment configurations. In some embodiments, hinge 201 may not be active or included.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A lighting device with a rotatable support, comprising:

a lamp body, characterized in that a support provided on the lamp body can rotate relative to the lamp body; and a lighting port of the lamp body is arranged on the side wall of the lamp body toward the direction of the rotation center line of the support, the support running along a length of the lamp body, such that the rotation center line is parallel to the length, the length being greater than a width and a depth of the lamp body, such that the lighting port is shaped such that the lighting port is rotatable about the rotation center line;

two grippers at both ends of the support are sleeved at positions of two circular grooves of the lamp body;

the end of the lamp body is provided with a focus-adjustable strong light lamp head;

the other end of the lamp body is provided with a charging socket and a switch button for start-stop and mode switching;

a cap, the cap covering the charging socket and the switch button, the switch button operable by directly pressing on the cap without opening the cap.

2. The lighting device with a rotatable support according to claim 1, characterized in that: an anti-skid ring is also provided between the groove wall of the circular groove and the gripper.

3. The lighting device with a rotatable support according to claim 1, characterized in that the gripper is closed ring structure.

4. The lighting device with a rotatable support according to claim 1, characterized in that the gripper is a non-closed ring structure with an opening.

5. The lighting device with a rotatable support according to claim 1, characterized in that a magnetic block is provided on the handle.

6. The lighting device with a rotatable support according to claim 1, characterized in that: the end of the lamp body is also provided with a focus-adjustable strong light lamp head.

7. The lighting device with a rotatable support according to claim 1, wherein the lamp body is further provided with a buzzer.

8. The lighting device with a rotatable support according to claim 1, characterized in that: the lamp body is provided with a waterproof cap at the location corresponding to the area where the charging socket, the discharging socket and the switch button are located.

9. The lighting device with a rotatable support according to claim 8, characterized in that the waterproof cap is made of soft material.

10. A lighting device comprising:

a device body;

an area light on a side of the device body;

a handle, the handle rotatably attached to the device body, such that the handle is positionable in a variety of positions relative to the area light around the device body, the area light rotatable in the direction of the rotation center line of the handle, the handle running along a length of the device body, such that the rotation center line is parallel to the length, the length being greater than a width and a depth of the device body such that the area light is shaped such that the area light is rotatable about the rotation center line;

two grippers at both ends of the handle are sleeved at positions of two circular grooves of the device body;

the end of the device body is provided with a focus-adjustable strong light lamp head;

the other end of the device body is provided with a charging socket and a switch button for start-stop and mode switching;

a cap, the cap covering the charging socket and the switch button, the switch button operable by directly pressing on the cap without opening the cap.

11. The lighting device of claim 10, wherein the handle includes a magnetic portion such that the handle is magnetically attachable to a magnetizable material to support the device body.

12. The lighting device of claim 11 wherein the handle is removable attachable to the device body via a first and second grip.

13. The lighting device of claim 12, wherein the handle includes a hinge, such that the first grip is removable from the device body and rotatable away from the device body while the second grip is attached to the device body.

14. The lighting device of claim 13, further comprising a directional light on the device body.

15. The lighting device of claim 14, wherein the device body is a cylinder, the area light is on a side of the cylinder, and the directional light is on an end of the cylinder and the handle rotates around the side of the cylinder.

* * * * *